(12) United States Patent
Bhatti et al.

(10) Patent No.: US 7,707,264 B2
(45) Date of Patent: Apr. 27, 2010

(54) METHOD AND SYSTEM FOR PROVIDING TECHNICAL SUPPORT DOCUMENTS VIA THE INTERNET

(75) Inventors: Kristen L. Bhatti, Boise, ID (US); Shahzad Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1862 days.

(21) Appl. No.: 09/873,741

(22) Filed: Jun. 4, 2001

(65) Prior Publication Data

US 2002/0184341 A1 Dec. 5, 2002

(51) Int. Cl.
*G06F 15/16* (2006.01)
(52) U.S. Cl. .................. 709/217; 709/205; 709/219; 709/223; 717/100
(58) Field of Classification Search .............. 709/217, 709/203, 219, 223, 224, 205; 717/100
See application file for complete search history.

(56) References Cited

U.S. PATENT DOCUMENTS 6,021,433 A * 2/2000 Payne et al. .................. 709/219
6,161,209 A * 12/2000 Moher ........................ 714/780
6,182,133 B1 * 1/2001 Horvitz ....................... 709/223
6,519,626 B1 * 2/2003 Soderberg et al. ........... 709/203
6,615,240 B1 * 9/2003 Sullivan et al. .............. 709/205
6,625,643 B1 * 9/2003 Colby et al. ................. 709/217
6,728,753 B1 * 4/2004 Parasnis et al. .............. 709/203
6,772,408 B1 * 8/2004 Velonis et al. ............... 717/100
6,859,829 B1 * 2/2005 Parupudi et al. ............. 709/224
6,922,720 B2 * 7/2005 Cianciarulo et al. ......... 709/217

FOREIGN PATENT DOCUMENTS

| EP | 0602787 | 6/1994 |
|----|---------|--------|
| WO | WO 97/15009 | 4/1997 |
| WO | WO 00/74193 | 12/2000 |

OTHER PUBLICATIONS

French search report for French Application No. 0206775. Report issued Jun. 21, 2007.

* cited by examiner

*Primary Examiner*—Tammy T Nguyen

(57) ABSTRACT

A method for providing technical support documents on a peripheral device connected to a web server storing the requested technical support documents via the Internet, which includes the steps of selecting an event on the device, requesting a default uniform resource locator with the selected event, and returning the technical support document relating to the selected event of the requested uniform resource locator to the device.

15 Claims, 4 Drawing Sheets

Printer will not Pull From a Particular Tray

Printer will not pull paper from a particular tray, but pulls correctly from other trays.

troubleshooting steps:

1. Verify that the paper guides are installed properly in the non-functioning tray.

2. On Tray 2 and Tray 3, ensure that the green or blue bar, located to the left of the paper, is inserted into the correct slot in both the front and back of the trays; also ensure that the guide is not skewed.

3. On Tray 2 and Tray 3, verify that the four white "fingers" are not broken on the back of the tray. Without the green or blue bar present, all four fingers should be in the down position. With the bar in the letter position, the left finger (as viewed from the back of the tray) will be in the up position. In the legal position, the left two fingers will be in the up position.

4. On Tray 4, attempt the following:
    * Ensure that the unit is powered on (Tray 4 has its own power source and power cord. (Check to see if the LED on the front of the tray is on.)
    * Ensure that the unit is connected to the printer's controller board with the C-Link or communication cable.
    * Ensure that the Tray 1 is not set to FIRST (set it to CASSETTE) or manually designate the paper source as "Tray 4" from the driver properties in the application's print dialogue box.

5. In the printer's control panel, determine the Tray 1 mode (it should be either FIRST or CASSETTE).
    * If you are attempting to print from Tray 1, and it is set to CASSETTE, then verify that the paper size is set to the appropriate size. (You can find both of these options in the Paper Handling Menu, or from a printout of the printer's Menu Map.)
    * If you are attempting to print from trays 2-4, and Tray 1 is set to FIRST, then manually choose the tray as the designated paper source (do this from the driver properties inside the application's print dialogue box).

FIG. 5

METHOD AND SYSTEM FOR PROVIDING TECHNICAL SUPPORT DOCUMENTS VIA THE INTERNET

The present invention generally relates to an improved method and system for providing technical support documents via the Internet. More specifically, it relates to an improved method and system for providing technical support documents via the Internet on a peripheral device connected to a web server storing the requested technical support documents.

BACKGROUND OF THE INVENTION

Currently, the technical support documents of peripheral devices, such as printers, are generally included on a CD Rom. The control panel of the peripheral device provides some control panel messages, which tend to be very short messages. As a result, they are usually not very informative or helpful. However, these messages tend to be shorter because they are generally stored in the firmware of the peripheral device. Firmware, which is generally used for peripheral devices, is software responsible for the operations of the device, and it is stored in read-only memory (ROM) or programmable ROM (PROM). However, the storage capacity of the ROM tends to be very limited. Users are, then, forced to access the technical support document located on CD Rom for troubleshooting solutions when confronted with an error message displayed on the device.

The problem with this prior method is that it is not always clear to the user which technical support documents are relevant for a given error or control panel message. This is especially true for typical users. Users generally do not have the technical background needed to make such a determination. Consequently, it would be extremely helpful and desirable if the peripheral device itself can provide users with the relevant technical support document for each particular error message displayed. There is obviously a need for an improved method that can provide more direct technical support from the actual peripheral device.

BRIEF SUMMARY OF THE INVENTION

The present invention is directed to an improved method and system for providing technical support documents via the Internet. More specifically, it relates to an improved method and system for providing technical support documents via the Internet on a peripheral device connected to a web server storing the requested technical support documents.

The present invention provides a method that includes the steps of selecting an event on the device, requesting a default uniform resource locator ("URL") for the selected event, and returning the technical support document relating to the selected event of the requested uniform resource locator to the device.

The present invention further provides a system that includes a peripheral device for requesting technical support documents of a selected event using a default URL, and a web server for servicing the default uniform resource locator by returning the relevant technical support document that relates to the selected event.

DETAILED DESCRIPTION

Broadly stated, the present invention is directed to an improved method and system for providing technical support documents over the Internet. The method and system provide a way to provide the relevant technical documents for a displayed error message straight on the peripheral device. Aside from providing context sensitive technical support documents to users, the present invention also allows users to access a help menu from the peripheral device for obtaining the needed technical support documents.

An event is first selected either through the help menu or context sensitive table for a particular displayed error message. Then, a default URL is requested with the selected event. Consequently, a technical support document ("TSD") relating to the selected event is returned to the peripheral device. It should be understood that the use of "a" or "an" is also intended to mean "one or more" for better readability.

Figure 1:
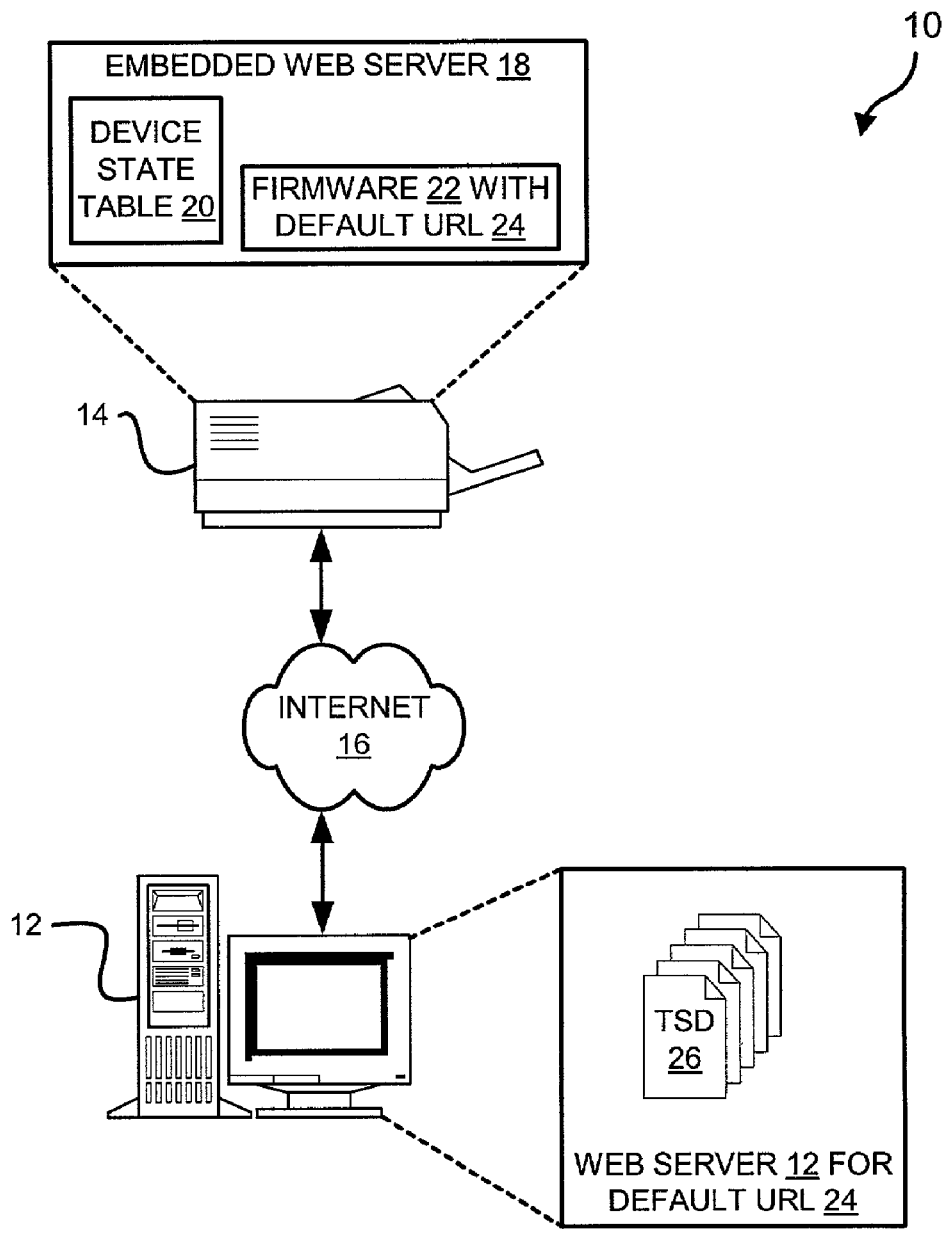
FIG. 1 is a schematic diagram of a network system in which the present method is implemented.

Turning now to the drawings, and particularly FIG. 1, a schematic diagram of a network system in which the present method can be implemented is shown and indicated generally at 10. A web server computer 12 is shown to be connected to a peripheral device 14, for example a printer, connected via the Internet 16. The peripheral device preferably contains the web client, device state table, firmware and the default URL for accessing the TSD's. The device state table 20 includes a list of the events that have been logged by the device, and these events are predefined by significant occurrences or happenings of the device.

The web server computer 12, on the other hand, services the default URL 24 included in the firmware 22 of the peripheral device 14. A number of TSDs 26 are made available to the peripheral device 14 by the web server computer 12 when requested. Although a single web server computer 12 and peripheral device 14 are shown, as is known in the art, multiple web server computers can be used for servicing a URL. Furthermore, in the actual implementation, a great number of peripheral devices 14 are preferably connected to the web server computer 12. Because the network system needed for the implementation of the present invention can vary greatly in complexity and size, the network topology shown in FIG. 1 is given as an example. Other network systems for implementing the present invention are contemplated and are within the scope of the present invention.

Figure 2:
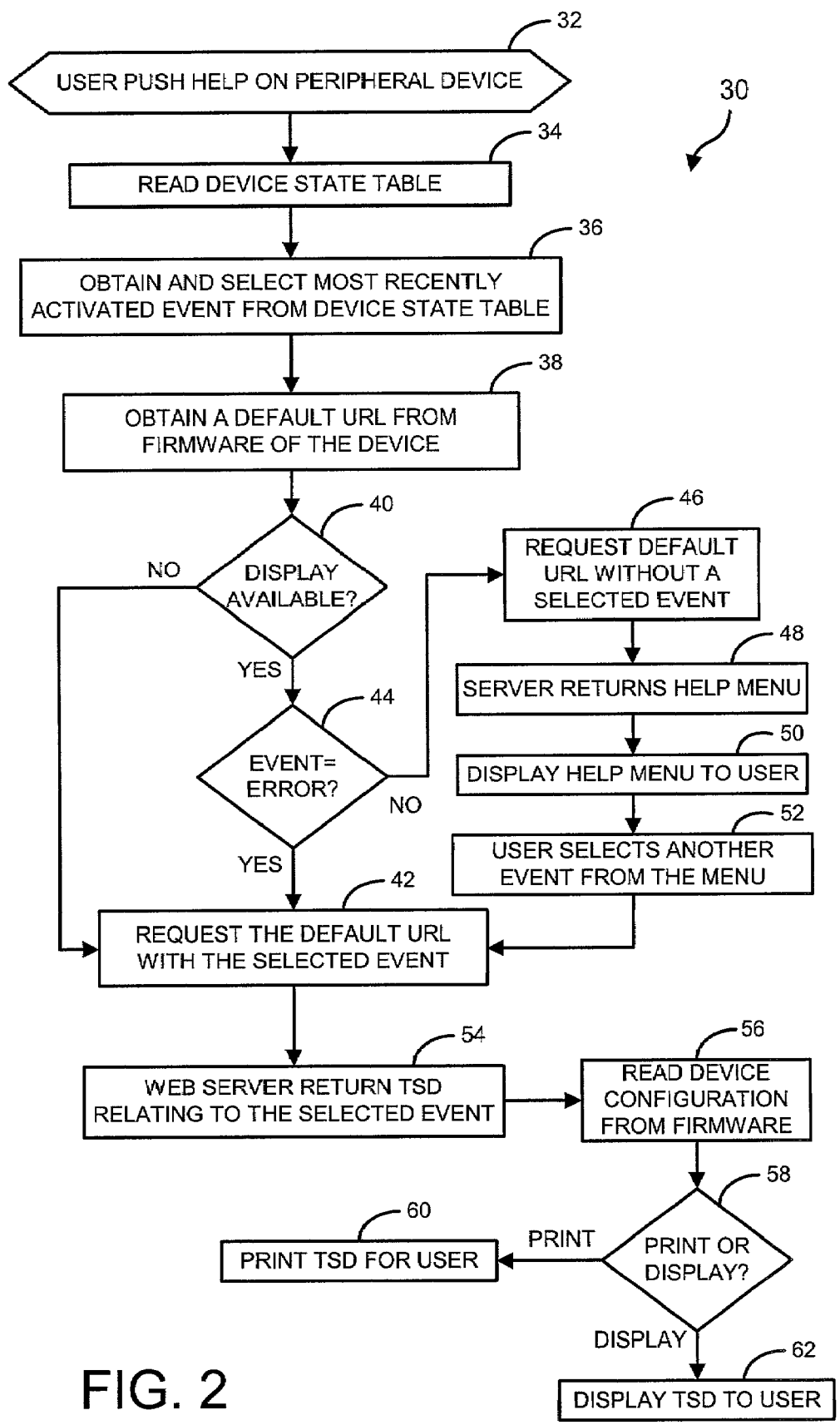
FIG. 2 is a flow chart illustrating the preferred functionality of a method of the present invention.

Turning to an important aspect of the preferred embodiment of the present invention, a flow chart of the preferred functionality of a method is shown in FIG. 2, and indicated generally at 30. The method is initiated by a user pushing HELP on the peripheral device (block 32). The HELP button on the peripheral device is the preferred dedicated switch to initialize the device to start the method to request a technical support document. However, other implementations of the dedicated switch can be used. For example, as the control panel display becomes larger and more sophisticated, an icon on the display may be available to users instead of a push button. Other implementations of the dedicated switch are contemplated and are within the scope of the present invention.

The device first reads the device state table (block 34) and obtains the most recently activated event that is to be selected as the selected event (block 36). Furthermore, the device also obtains a default URL from the firmware (block 38), which will be used later to request the TSD once the event selection has been finalized. It is next determined whether a display is available on the peripheral device (block 40). If a display is not available (block 40), the device, using its embedded web client, continues by requesting the default URL with the selected event (block 42), which is the most recently activated event in this case. The most recently activated event is automatically selected by the method, because the user cannot select another event through the help menu on the peripheral device without the display being available.

If, on the other hand, a display is available on the peripheral device (block 40), it is next determined whether the most recently activated event obtained from the device state table indicates an error (block 44). If the most recently activated event does indicate an error (block 44), the device is preferably configured to again request the default URL with the selected most recently activated event (block 42). From this configuration, the peripheral device is able to return a context sensitive TSD to the user. In other words, since the device requests a TSD related to the error event, only the relevant TSD will be returned to the user.

However, if the most recently activated event is not an error (block 44), the device is configured to request the default URL without a selected event (block 46). Because a selected event was not included with the request for the default URL (block 46), the web server computer 12, in response, returns a help menu (block 48). The help menu is then displayed to the user (block 50), and the user can then accordingly select another event from the menu (block 52). A request for the default URL with the selected event will again be sent to the web server computer (block 42). In the preferred embodiment, the help menu is located on the web server computer, and a request for the default URL without a selected event will prompt the web server computer to return a help menu. However, other implementations can be used, such as storing the help menu with the firmware on the device. In this case, when a request for the default URL is prompted without a selected event, the device can be configured to automatically return the help menu on the display. There may be other implementations with slight modifications, however these various implementations are contemplated and are within the scope of the present invention.

Once the selected event is obtained, either from the device state table (block 36) or from the user help menu (block 52), a request for the default URL with the selected event is made upon the web server computer (block 42), which prompts it to return a TSD relating to the selected event (block 54). After receiving the TSD (block 54), the device reads the device configuration from the firmware (block 56) to determine whether the TSD should be printed or displayed (block 58). Accordingly, the TSD is printed (block 60) or displayed (block 62) to the user, depending on the device configuration. In peripheral devices without a display, the device configuration can only be defined to print the TSD. However, for the peripheral devices with a display, it is contemplated that users can select the default device configuration to print or display the TSD.

Because the functionalities of each peripheral device can vary greatly, the preferred method can also be altered as a result. It is contemplated that the present method can be changed to accommodate different devices and their particular models as well. As a result, it should be understood that these other methods are within the scope of the present invention.

Figure 3:
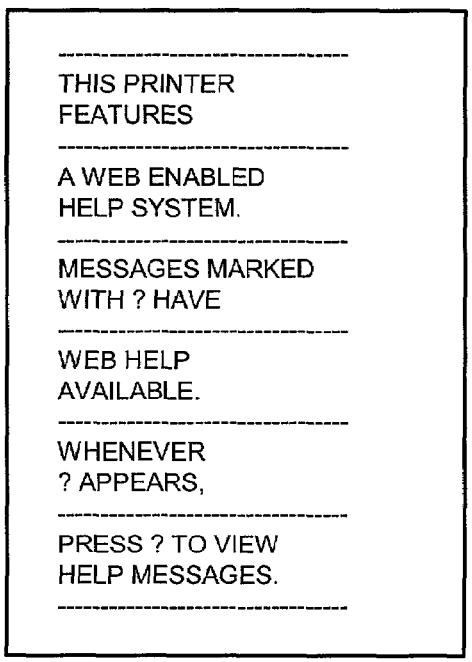
FIG. 3 illustrates an example of control panel messages when the HELP button is pressed on a peripheral device with no error condition.

An example of control panel messages when the HELP button is pressed on the peripheral device when there is no error condition is shown in FIG. 3 and indicated generally at 70. More specifically, FIG. 3 shows an example of the help menu that can be displayed to users when the most recently activated event from the device state table is not an error. From this help menu, users can choose an event or a topic for requesting a TSD from the web server computer. For this particular example, the peripheral device is a printer with a display control panel. Consequently, the events are configured and designed to fit the printer. However, the present invention can also work with any type of peripheral devices, such as a scanner or a fax machine. The help menu can vary as a result. Because the display on the control panel is generally small in size, typically only two to three lines can be displayed at a time. In this example, the dashed line is to indicated when users must scrolled down to see the next message.

Figure 4:
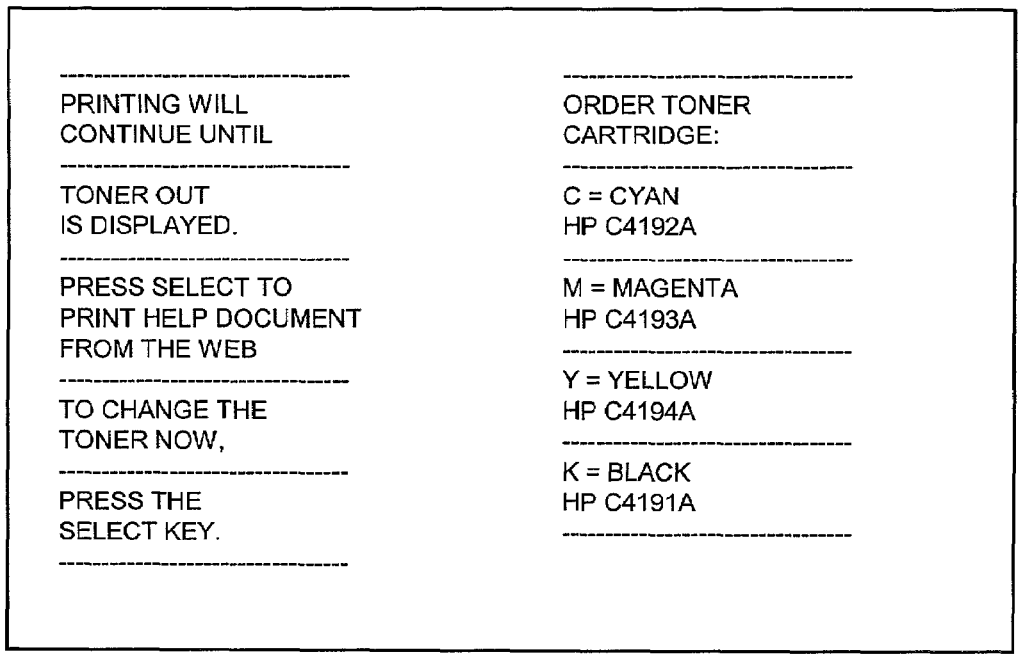
FIG. 4 illustrates an example of control panel messages when the HELP button is pressed on a peripheral device with an error message of "COLOR TONER LOW"; and, FIG. 5 illustrates an example of a technical support document that can be displayed or printed on the peripheral device.

Turning to another example, an exemplary display of the control panel messages of a printer when the HELP button is pressed on an error message of "COLOR TONER LOW" is shown in FIG. 4 and indicated generally at 80. In this scenario, a printer is displaying a "COLOR TONER LOW ?" message on the control panel. A user presses the help button on the printer, which prompts the device to display the panel messages shown in FIG. 4. In this particular example, the user can select to print the help document (i.e., TSD) from the web. If selected, the device sends a URL request with the event defining the "COLOR TONER LOW" message to the web server computer 12, and a TSD relating to that event will be printed on the device.

An example of a technical support document that can be displayed or printed on the peripheral device is shown in FIG. 5. As shown, the TSD provides a detailed description to solve a particular problem, specially an error when printer will not pull paper from a particular tray. However, in this example of the TSD, no figures are shown. But, since the capacity of the memory storage is no longer a major concern, figures for user friendly instructions can be included for clarity.

Because the TSDs are stored on the web server computer, very extensive and informative documents can be provided to users. This is so because the limited memory storage of the ROM is no longer being used for storing the TSDs for the peripheral device. But at the same time, the web server computer is able to return the TSD that is most relevant to an error that the device might be experiencing. Furthermore, since the TSDs needed are stored on the web server computer, any updates or changes can easily be accomplished at one central location for devices that were sold throughout the world.

From the foregoing description, it should be understood that an improved method and system for providing technical support documents via the Internet has been shown and described, which has many desirable attributes and advantages. The method and system provide a way for users to easily obtain context sensitive or requested technical support documents via the Internet. As a result of these documents being stored on a web server computer outside of the peripheral device, extensive and informative graphical technical support documents can be provided to users. Furthermore, because the present invention provides for a central location to obtain these documents, any updating or changing of these documents can be easily achieved with fewer efforts.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for selectively providing technical support documents from a web server having access to the requested technical support documents to a peripheral device that has printer, scanner and/or fax functionality via the Internet, the peripheral device being of the type which is capable of executing activated operating events and having an associated web client with a stored default URL for accessing the web server, the method comprising the steps of:

activating an event on the device;
requesting the default uniform resource locator with the activated event; and,
returning to the device one or more of the technical support documents that relate to the activated event of the requested uniform resource locator.

2. The method according to claim 1 further comprising the steps of:

reading device configurations from the web client;
determining whether to print or display the returned technical support document from the device configuration;
printing the returned one or more technical support documents when the device configuration indicates print; and,
displaying the returned technical support document when the device configuration indicates display.

3. The method according to claim 1 wherein, prior to said step of requesting a default uniform resource locator with the activated event, further comprising the step of obtaining a default uniform resource locator from the web client.

4. A method for selectively providing technical support documents from a web server having access to the requested technical support documents from a web server having access to the requested technical support documents to a peripheral device that has a printer, scanner end/or fax functionality via the Internet, the peripheral device being of the type which is capable of executing activated operating events and having an associated web client with a stored default URL for accessing the web server, the method comprising the steps of:

activating an event on the device;
requesting the default uniform resource locator with the activated event; end,
returning to the device one or more of the technical support documents that relate to the activated event of the requested uniform resource locator:
wherein said step of requesting the default uniform resource locator further comprising the steps of:
reading a device state table of the peripheral device;
obtaining a most recently activated event from the device state table; and
determining whether the most recently activated event produced an error.

5. The method according to claim 4 wherein said step of determining whether the most recently activated event is an error farther comprising the steps of:

selecting the most recently activated event when the most recently activated event produced an error; and,
requesting the default uniform resource locator without an activated event when the most recently activate event did not produce an error.

6. The method according to claim 5 wherein said step of obtaining a default uniform resource locator further comprising the steps of:

returning a help menu for activating an event;
displaying the help menu to the user;
choosing an event from the help menu by the user; and,
selecting the chosen event from the help menu as the activated event.

7. A method comprising:

in response to receiving a help command, identifying an event which has occurred on a peripheral device where the event has produced an error;
using a default uniform resource locator to transmit a request to a web server; and,
where the request causes the web server to return one or more technical support documents which relate to the error.

8. A computer program product comprising a computer usable medium having computer readable program codes embodied in the medium that when executed causes a computer to:

obtain a most recently activated event from a device state table in a peripheral device computer, wherein the peripheral device computer is part of a peripheral device that has printer, scanner and/or fax functionality;
request a default uniform resource locator for a server having technical support documents relating to the most recently activated event; and,
return one or more technical support documents relating to the most recently activated event to the device.

9. A computer program product comprising a computer usable medium having computer readable program codes embodied in the medium that when executed causes a computer to:

select an event on a peripheral device where the event has produced an error message;
obtain a default uniform resource locator from firmware of the peripheral device;
use the default uniform resource locator to transmit to a remote computer a request that identifies at least one of the selected event and the error message; and,
return to the peripheral device one or more technical support documents relating to the error message.

10. A system for providing technical support documents to a peripheral device via the Internet, comprising:

a peripheral device having a web client, the peripheral device being configured to request, in response to an error event, a relevant technical support document from a web server using a default uniform resource locator; and,
a web server for responding to the request by returning the relevant technical support document relating to the error event.

11. The system as defined in claim 10 further comprising a dedicated switch on the peripheral device for users to request technical support documents.

12. The system as defined in claim 11 wherein said dedicated switch is a push button located on the peripheral device.

13. The system as defined in claim 11 wherein said dedicated switch is an icon that is displayed on the control panel of the peripheral device.

14. The system as defined in claim 10 wherein said peripheral device further comprising a device state table for storing a log of events of the device, wherein the most recently activated event from the device state table is the activated event when the peripheral device makes a technical support document request.

15. The system as defined in claim 10 wherein the activated event is appended to the request for the default uniform resource locator.

* * * * *

UNITED STATES PATENT AND TRADEMARK OFFICE
CERTIFICATE OF CORRECTION

| | | |
|---|---|---|
| PATENT NO. | : 7,707,264 B2 | Page 1 of 1 |
| APPLICATION NO. | : 09/873741 | |
| DATED | : April 27, 2010 | |
| INVENTOR(S) | : Kristen L. Bhatti et al. | |

It is certified that error appears in the above-identified patent and that said Letters Patent is hereby corrected as shown below:

In column 5, line 38, in Claim 4, delete "end/or" and insert -- and/or --, therefor.

In column 5, line 45, in Claim 4, delete "end," and insert -- and, --, therefor.

In column 5, line 57, in Claim 5, delete "farther" and insert -- further --, therefor.

Signed and Sealed this

Thirty-first Day of August, 2010

David J. Kappos
*Director of the United States Patent and Trademark Office*